(12) United States Patent
Lee (10) Patent No.: US 12,024,108 B2
(45) Date of Patent: Jul. 2, 2024

(54) METHOD AND APPARATUS FOR CONTROLLING DEPLOYMENT OF AIRBAG

(71) Applicant: HYUNDAI MOBIS CO., LTD., Seoul (KR)

(72) Inventor: Dae Sung Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 655 days.

(21) Appl. No.: 17/342,107

(22) Filed: Jun. 8, 2021

(65) Prior Publication Data
US 2021/0387585 A1     Dec. 16, 2021

(30) Foreign Application Priority Data

Jun. 10, 2020   (KR) ................. 10-2020-0070132

(51) Int. Cl.
  *B60R 21/0132*   (2006.01)
  *B60R 21/01*   (2006.01)
(52) U.S. Cl.
  CPC ........... *B60R 21/01338* (2014.12); *B60R 2021/01013* (2013.01); *B60R 2021/01211* (2013.01); *B60R 2021/01322* (2013.01)
(58) Field of Classification Search
  CPC .... B60R 21/01338; B60R 2021/01013; B60R 2021/01211; B60R 2021/01322
  See application file for complete search history.

(56) References Cited

FOREIGN PATENT DOCUMENTS

| | | |
|---|---|---|
| CN | 1272820 A | 11/2000 |
| CN | 1447762 A | 10/2003 |
| CN | 1468180 A | 1/2004 |
| CN | 111137281 A | 5/2020 |
| DE | 102008043637 A1 | 5/2010 |
| DE | 102014107618 A1 | 12/2014 |
| DE | 102015116142 A1 | 3/2017 |
| JP | 2016060389 A | 4/2016 |
| KR | 10-2009-0110980 A | 10/2009 |

OTHER PUBLICATIONS

Office Action issued on Dec. 19, 2023 in the corresponding Chinese Patent Application No. 202110626787.2.
Office Action issued on Jul. 6, 2022 in the corresponding German Patent Application No. 102021114806.5.
Office Action issued on May 27, 2023 in the corresponding Chinese Patent Application No. 202110626787.2.

*Primary Examiner* — Mathew Franklin Gordon
(74) *Attorney, Agent, or Firm* — NovoTechIP International PLLC (57) ABSTRACT

Provided are a method and an apparatus for controlling the deployment of an airbag. The method includes steps of: determining whether a complex collision has occurred, based on collision-related physical quantities due to a vehicle collision; and adjusting a threshold value as a criterion for determining whether to deploy an airbag when the complex collision has occurred as a result of the determination.

20 Claims, 4 Drawing Sheets

METHOD AND APPARATUS FOR CONTROLLING DEPLOYMENT OF AIRBAG

CROSS-REFERENCE TO RELATED APPLICATION

This application claims priority from and the benefit of Korean Patent Application No. 10-2020-0070132, filed on Jun. 10, 2020, which is hereby incorporated by reference for all purposes as if set forth herein.

BACKGROUND

Field

Exemplary embodiments of the present disclosure relate to a method and an apparatus for controlling the deployment of an airbag, and more particularly, to a method and an apparatus for controlling the deployment of an airbag, capable of deploying, when a primary collision and a secondary collision consecutively occur, an airbag by reducing a threshold value for airbag deployment during the secondary collision.

Discussion of the Background

In general, an airbag system is a system that instantaneously inflates an airbag during a vehicle collision and safely protects a passenger in a vehicle through a cushion action of the airbag.

In order to determine whether to deploy the airbag in the vehicle during the vehicle collision, the airbag system determines the vehicle collision by using sensing information measured by various sensors mounted in the vehicle.

In such a case, the airbag system determines the collision and collision intensity by using deceleration and acceleration information measured by an acceleration sensor included in an airbag control unit located inside the vehicle, a forward collision sensor mounted in the front of the vehicle, and a side collision sensor mounted on the side of the vehicle, and determines an airbag deployment time point by applying such deceleration and acceleration information to an airbag deployment algorithm.

The background art of the present disclosure is disclosed in Korean Patent Application Laid-Open No. 10-2009-0110980 (published on Oct. 26, 2009 and entitled "Airbag System for Car").

SUMMARY

The airbag system in the related art deploys a front airbag when a front physical quantity measured during a forward collision is equal to or greater than a threshold value set in advance and deploys a side airbag when a side physical quantity measured during a side collision is equal to or greater than the threshold value.

However, in the case of a complex collision in which a primary collision and a secondary collision consecutively occur, a physical quantity in each collision may be relatively small, which makes it difficult to injure a passenger independently. However, when the primary collision and the secondary collision consecutively occur within a short period of time, complex collision may injure the passenger. Accordingly, there is a need to protect the passenger from injury even in the case of the complex collision.

Various embodiments are directed to providing a method and an apparatus for controlling the deployment of an airbag, which reduces, when a primary collision and a secondary collision consecutively occur, a threshold value for airbag deployment and deploys the airbag based on the reduced threshold value during the secondary collision.

A method for controlling the deployment of an airbag in accordance with an aspect of the present disclosure may include steps of: determining whether a complex collision has occurred, based on collision-related physical quantities due to a vehicle collision; and adjusting a threshold value, to produce an adjusted threshold value, as a criterion for determining whether to deploy an airbag when the complex collision has occurred as a result of the determination.

In the present disclosure, in the step of adjusting the threshold value for airbag deployment, the threshold value may be reduced.

In the present disclosure, the collision-related physical quantities may include at least one of velocity in an X-axis direction, displacement in the X-axis direction, velocity in a Y-axis direction, displacement in the Y-axis direction, vector values of the velocity in the X-axis direction/the velocity in the Y-axis direction, and vector values of the displacement in the X-axis direction/the displacement in the Y-axis direction.

In the present disclosure, in the step of determining whether the complex collision has occurred, a primary collision may be detected based on the collision-related physical quantities, and it may be determined that the complex collision has occurred when a secondary collision is detected within a preset time after the primary collision is detected.

In the present disclosure, the method may further include a step of determining whether to deploy the airbag according to the adjusted threshold value and deploying the airbag according to a determination result.

In the present disclosure, in the step of deploying the airbag, the airbag may be deployed when at least one of the collision-related physical quantities is equal to or greater than the adjusted threshold value.

A method for controlling the deployment of an airbag in accordance with another aspect of the present disclosure may include steps of: detecting a primary collision based on collision-related physical quantities due to a vehicle collision; comparing the collision-related physical quantities detected during the primary collision with a threshold value as a criterion for determining whether to deploy an airbag, and deploying the airbag according to a comparison result; detecting a secondary collision based on the collision-related physical quantities in a state in which the airbag is not deployed; adjusting the threshold value, to produce an adjusted threshold value, when the secondary collision is detected; and determining whether to deploy the airbag according to the adjusted threshold value and deploying the airbag according to a determination result.

In the present disclosure, in the step of adjusting the threshold value, the threshold value may be reduced.

In the present disclosure, the collision-related physical quantities may include at least one of velocity in an X-axis direction, displacement in the X-axis direction, velocity in a Y-axis direction, displacement in the Y-axis direction, vector values of the velocity in the X-axis direction/the velocity in the Y-axis direction, and vector values of the displacement in the X-axis direction/the displacement in the Y-axis direction.

In the present disclosure, in the step of detecting the secondary collision, the secondary collision may be determined according to the collision-related physical quantities detected within a preset time after the primary collision is detected.

In the present disclosure, in the step of deploying the airbag, the airbag may be deployed when at least one of the collision-related physical quantities is equal to or greater than the adjusted threshold value.

An apparatus for controlling the deployment of an airbag in accordance with an aspect of the present disclosure may include: a complex collision determination section that determines whether a complex collision has occurred, based on collision-related physical quantities detected by a collision detection unit; and a threshold value adjustment section that adjusts a threshold value, to produce an adjusted threshold value, as a criterion for determining whether to deploy an airbag when the complex collision determination section determines that the complex collision has occurred.

In the present disclosure, the threshold value adjustment section may reduce the threshold value.

In the present disclosure, the collision-related physical quantities may include at least one of velocity in an X-axis direction, displacement in the X-axis direction, velocity in a Y-axis direction, displacement in the Y-axis direction, vector values of the velocity in the X-axis direction/the velocity in the Y-axis direction, and vector values of the displacement in the X-axis direction/the displacement in the Y-axis direction.

In the present disclosure, the complex collision determination section may detect a primary collision based on the collision-related physical quantities, and determine that the complex collision has occurred when a secondary collision is detected within a preset time after the primary collision is detected.

In the present disclosure, the apparatus may further include an airbag deployment control section that determines whether to deploy the airbag according to the adjusted threshold value and deploys the airbag according to a determination result.

In the present disclosure, the airbag deployment control section may deploy the airbag when at least one of the collision-related physical quantities is equal to or greater than the adjusted threshold value.

An apparatus for controlling the deployment of an airbag in accordance with another aspect of the present disclosure may include: a complex collision determination section that detects a primary collision based on collision-related physical quantities due to a vehicle collision, and determines that a complex collision has occurred when a secondary collision is detected within a preset time after the primary collision is detected; a threshold value adjustment section that adjusts a threshold value, to produce an adjusted threshold value, when the secondary collision is detected; and an airbag deployment control section that compares the collision-related physical quantities detected during the primary collision with the threshold value as a criterion for determining whether to deploy an airbag, deploys the airbag according to a comparison result, determines whether to deploy the airbag according to the adjusted threshold value when the secondary collision is detected in a state in which the airbag is not deployed during the primary collision, and deploys the airbag according to a determination result.

In the present disclosure, the threshold value adjustment section may reduce the threshold value.

In the present disclosure, the collision-related physical quantities may include at least one of velocity in an X-axis direction, displacement in the X-axis direction, velocity in a Y-axis direction, displacement in the Y-axis direction, vector values of the velocity in the X-axis direction/the velocity in the Y-axis direction, and vector values of the displacement in the X-axis direction/the displacement in the Y-axis direction.

In the present disclosure, the airbag deployment control section may deploy the airbag when at least one of the collision-related physical quantities is equal to or greater than the adjusted threshold value.

According to the method and the apparatus for controlling the deployment of an airbag in accordance with an aspect of the present disclosure, when a primary collision and a secondary collision consecutively occur, a threshold value for airbag deployment is reduced to deploy the airbag based on the reduced threshold value during the secondary collision, thereby minimizing injury to a passenger during a complex collision.

The method and the apparatus for controlling the deployment of an airbag in accordance with another aspect of the present disclosure reduce a field claim due to the non-deployment of an airbag during a complex collision.

DETAILED DESCRIPTION OF THE ILLUSTRATED EMBODIMENTS

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a method and an apparatus for controlling the deployment of an airbag in accordance with the present disclosure will be described in detail with reference to the accompanying drawings. In this process, the thickness of lines or the sizes of elements illustrated in the drawings may be exaggerated for the purpose of clarity and convenience of explanation. Furthermore, terms to be described later are terms defined in consideration of functions in the present disclosure and may be changed according to the intention of a user or an operator, or practice. Accordingly, such terms should be defined based on the disclosure over the present specification.

The implementations described in the present specification may be implemented with a method or process, an apparatus, a software program, a data stream or signal, for example. Although discussed only in the context of a single form of implementation (for example, discussed only as a method), the discussed features may also be implemented as other forms (for example, an apparatus or a program). The apparatus may be implemented with appropriate hardware, software, firmware and the like. The method may be implemented in an apparatus such as a processor generally referring to a processing device including a computer, a microprocessor, an integrated circuit, or a programmable logic device. The processor includes a communication device such as a computer, a cellular phone, a portable/personal digital assistant (PDA), and other devices that facilitate communication of information between end users.

Figure 1:
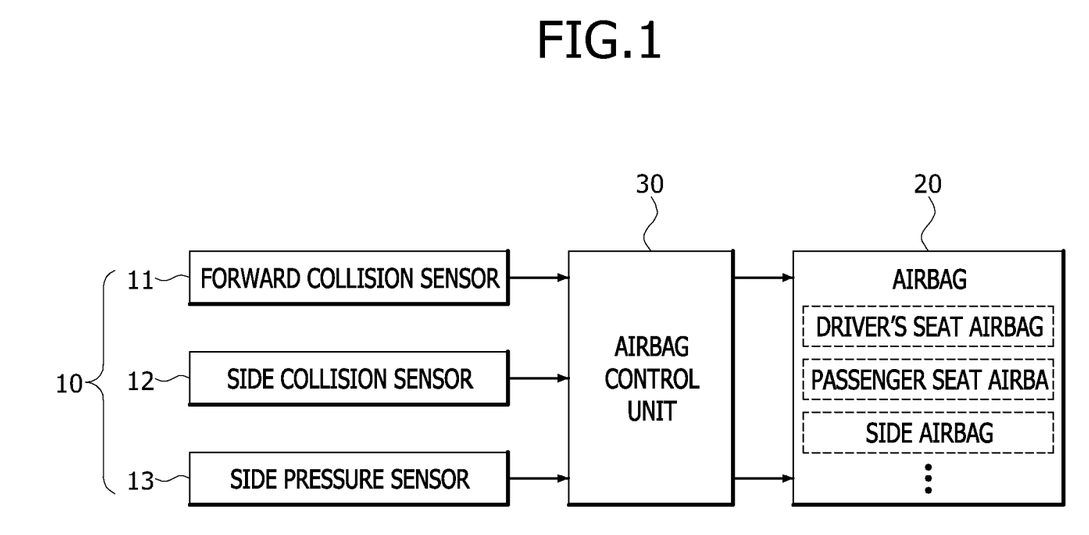
FIG. 1 is a block configuration diagram illustrating an apparatus for controlling the deployment of an airbag in accordance with an embodiment of the present disclosure.
Figure 2:
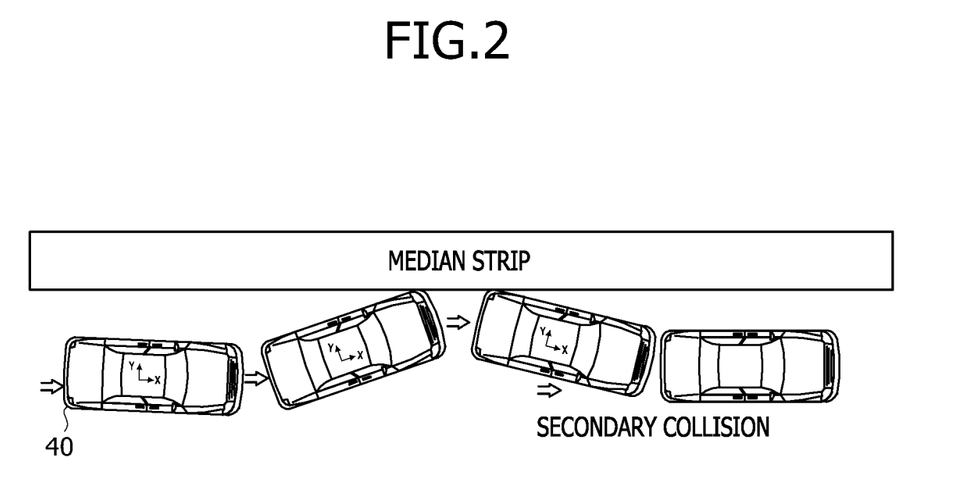
FIG. 2 is a diagram conceptually illustrating a complex collision in accordance with an embodiment of the present disclosure.
Figure 3:
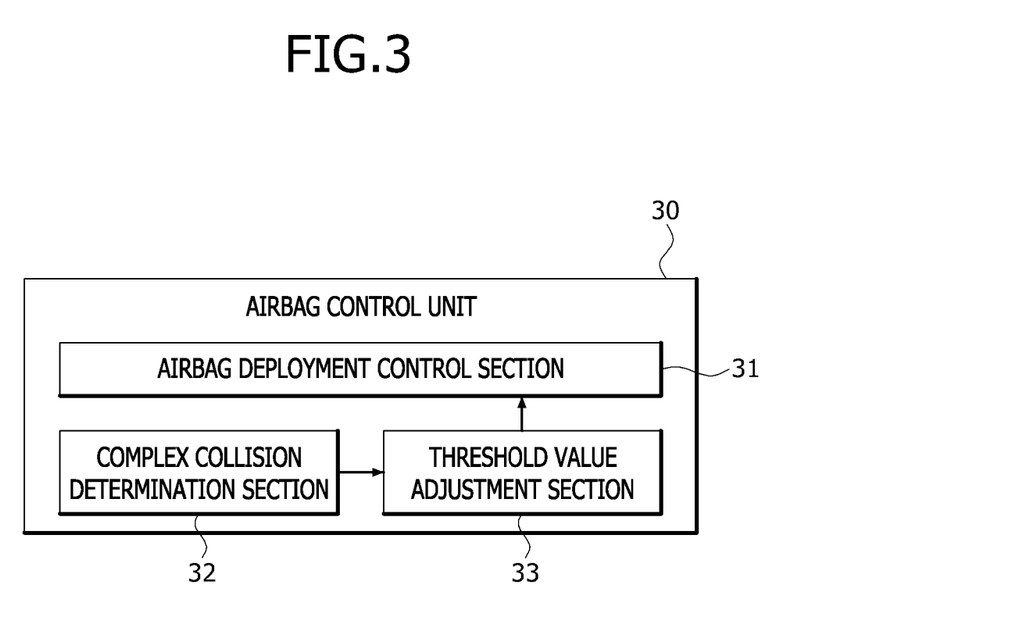
FIG. 3 is a block configuration diagram illustrating an airbag control unit in accordance with an embodiment of the present disclosure.
Figure 4:
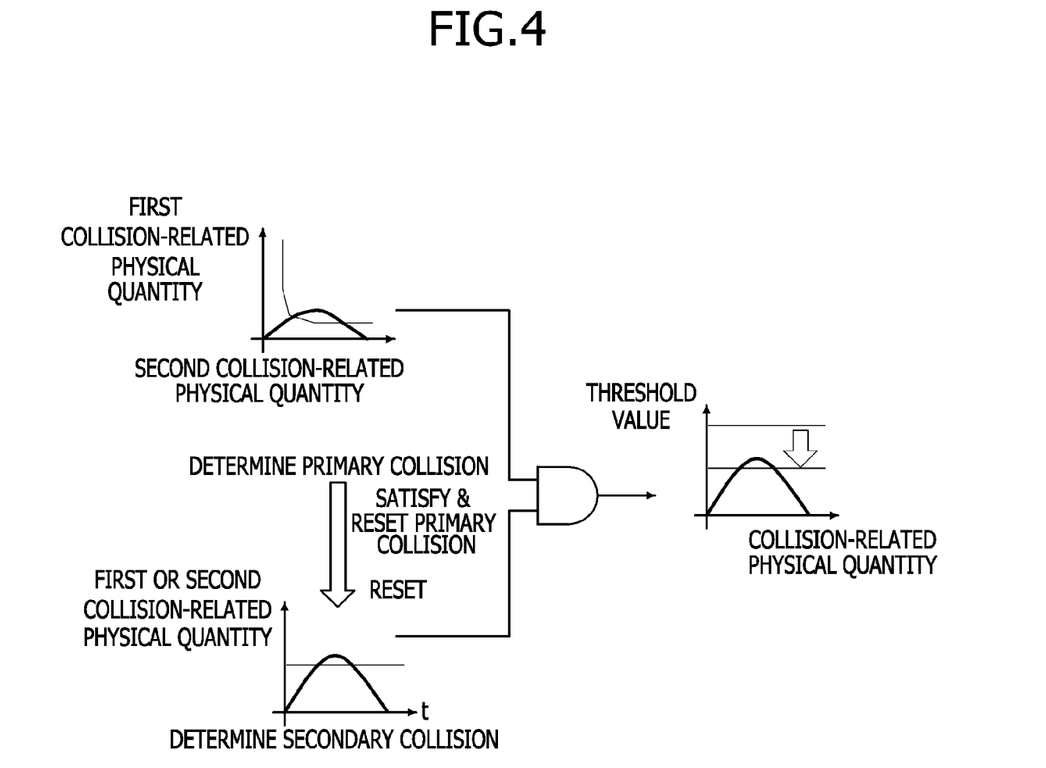
FIG. 4 is a diagram conceptually illustrating an example of adjusting a threshold value during a complex collision in accordance with an embodiment of the present disclosure.

FIG. 1 is a block configuration diagram illustrating an apparatus for controlling the deployment of an airbag in accordance with an embodiment of the present disclosure, FIG. 2 is a diagram conceptually illustrating a complex collision in accordance with an embodiment of the present disclosure, FIG. 3 is a block configuration diagram illustrating an airbag control unit in accordance with an embodiment of the present disclosure, and FIG. 4 is a diagram conceptually illustrating an example of adjusting a threshold value during a complex collision in accordance with an embodiment of the present disclosure.

Referring to FIG. 1, the apparatus for controlling the deployment of an airbag in accordance with an embodiment of the present disclosure includes a collision detection unit 10, an airbag 20, and an airbag control unit (ACU) 30.

The collision detection unit 10 detects a collision of a vehicle 40. The collision detection unit 10 includes a forward collision sensor 11, a side collision sensor 12, and a side pressure sensor 13.

The forward collision sensor 11 is mounted on a bumper side of a vehicle body, that is, a side member or a front end module (FEM), and detects a forward collision as an acceleration signal.

The side collision sensor 12 is mounted on a lateral side of the vehicle body and detects a side collision as an acceleration signal.

The forward collision sensor 11 and the side collision sensor 12 may not exist separately, but be mounted in the airbag control unit 30 as sensors that detect accelerations in a longitudinal direction ACU-X and a transverse direction ACU-Y of the vehicle.

The side pressure sensor 13 is mounted on the lateral side of the vehicle body and detects pressure caused by a side collision as an acceleration signal.

The airbag 20 is instantaneously inflated during a collision of the vehicle 40, and safely protects a passenger in the vehicle 40 through a cushion action. The airbag 20 may be installed in a steering wheel (driver's seat airbag), an instrument panel on a passenger seat side (passenger airbag), a side (side airbag), and the like, in order to protect a passenger from a collision of the vehicle 40. The airbag 20 may be installed in various positions according to the vehicle 40 in addition to the steering wheel, the instrument panel on the passenger seat side, and the side described above.

The airbag control unit 30 detects a collision of the vehicle 40 according to the collision-related physical quantities detected by the aforementioned collision detection unit 10, and deploys the airbag 20.

The collision-related physical quantities may include at least one of velocity in an X-axis direction, displacement in the X-axis direction, velocity in a Y-axis direction, displacement in the Y-axis direction, vector values of the velocity in the X-axis direction/the velocity in the Y-axis direction, and vector values of the displacement in the X-axis direction/the displacement in the Y-axis direction.

That is, the airbag control unit 30 compares the collision-related physical quantities detected by the collision detection unit 10 with a preset threshold value for airbag deployment, deploys the airbag 20 when the comparison result indicates that at least one of the collision-related physical quantities is equal to or greater than the threshold value, and does not deploy the airbag 20 when the comparison result indicates that at least one of the collision-related physical quantities is smaller than the threshold value. Whether to deploy the airbag 20 may be determined by the aforementioned threshold value.

Thus, in the case of a complex collision in which a primary collision and a secondary collision consecutively occur as illustrated in FIG. 2, whenever the primary collision and the secondary collision occur, the airbag control unit 30 compares the collision-related physical quantities in each collision with the threshold value, and determines whether to deploy the airbag according to the comparison result. In the case of the aforementioned complex collision, a case where the collision-related physical quantities are relatively lower than the threshold value frequently occurs.

However, even though the collision-related physical quantities of each of the primary collision and the secondary collision are relatively lower than the threshold value for airbag deployment, there is a relatively high possibility of fatal injury to a passenger during two consecutive collisions, particularly, the secondary collision.

Accordingly, when detecting the aforementioned complex collision, the airbag control unit 30 deploys the airbag 20 by adjusting the threshold value for airbag deployment during the secondary collision, thereby minimizing injury to a passenger due to the complex collision.

Referring to FIG. 3, the airbag control unit 30 includes an airbag deployment control section 31, a complex collision determination section 32, and a threshold value adjustment section 33.

The airbag deployment control section 31 compares the collision-related physical quantities detected by the collision detection unit 10 with the threshold value for airbag deployment, and deploys the airbag 20 according to the comparison result.

More specifically, the airbag deployment control section 31 receives a detection signal from the collision detection unit 10, for example, at least one of the forward collision sensor 11, the side collision sensor 12, and the side pressure sensor 13.

The airbag deployment control section 31 controls the deployment of a driver's seat airbag 20 or a passenger seat airbag 20 based on the detection signal of the forward collision sensor 11, or controls the deployment of a side airbag 20 based on the detection signals of the side collision sensor 12 and the side pressure sensor 13.

That is, the airbag deployment control section 31 detects the collision-related physical quantities based on at least one of the detection signals for the accelerations in the longitudinal direction ACU-X and the transverse direction ACU-Y of the vehicle from the forward collision sensor 11 and the side collision sensor 12, and the detection signal of the side pressure sensor 13.

Subsequently, the airbag deployment control section 31 determines whether at least one of the detected collision-related physical quantities is equal to or greater than a threshold value preset in each of the collision-related physical quantities.

At this time, the airbag deployment control section 31 deploys the airbag 20 when at least one of the collision-related physical quantities is equal to or greater than the threshold value preset in each of the collision-related physical quantities, and does not deploy the airbag 20 when at least one of the collision-related physical quantities is smaller than the threshold value preset in each of the collision-related physical quantities.

Here, the aforementioned process in which the airbag deployment control section 31 determines whether to deploy the airbag based on the threshold value and deploys the airbag is independently performed during a vehicle collision, for example, for each of the primary and secondary collisions.

The complex collision determination section 32 determines whether a complex collision has occurred based on the collision-related physical quantities due to the vehicle collision.

That is, when the primary collision is detected based on the collision-related physical quantities and the secondary collision is detected within a preset time after the primary collision is detected, the complex collision determination section 32 determines that the complex collision has occurred.

Referring to FIG. 4, the airbag deployment control section 31 detects the collision-related physical quantities based on at least one of the detection signals for the accelerations in the longitudinal direction ACU-X and the transverse direction ACU-Y of the vehicle from the forward collision sensor 11 and the side collision sensor 12, and the detection signal of the side pressure sensor 13.

Subsequently, the complex collision determination section 32 compares each of these collision-related physical quantities (first and second collision-related physical quantities) with a first collision reference value preset in the corresponding physical quantity, and determines that a primary collision has occurred when at least one of these collision-related physical quantities is equal to or greater than the first collision reference value preset in the corresponding physical quantity.

As described above, when the primary collision is detected, the complex collision determination section 32 resets the primary collision and latches the primary collision.

At this time, the complex collision determination section 32 detects the secondary collision within a preset time after the primary collision is detected.

That is, the complex collision determination section 32 detects collision-related physical quantities based on at least one of the detection signals for the accelerations in the longitudinal direction ACU-X and the transverse direction ACU-Y of the vehicle from the forward collision sensor 11 and the side collision sensor 12 and the detection signal of the side pressure sensor 13, within the preset time after the primary collision is detected, and compares each of these collision-related physical quantities (first and second collision-related physical quantities) with a second collision reference value preset in the corresponding collision-related physical quantity. At this time, the complex collision determination section 32 determines that a secondary collision has occurred when at least one of these collision-related physical quantities is equal to or greater than the second collision reference value preset in the corresponding physical quantity.

In such a case, at least one of the collision-related physical quantities as a criterion for determining whether it is equal to or greater than the second collision reference value may be the same as or different from the collision-related physical quantities used when the primary collision is detected.

The threshold value adjustment section 33 adjusts the threshold value when the complex collision is detected by the complex collision determination section 32. In such a case, the threshold value adjustment section 33 reduces the threshold value for airbag deployment.

Consequently, the airbag deployment control section 31 determines whether to deploy the airbag according to the reduced threshold value during the secondary collision, and deploys the airbag 20, thereby minimizing injury to a passenger due to the non-deployment of the airbag 20 during the complex collision.

Hereinafter, a method for controlling the deployment of an airbag in accordance with an embodiment of the present disclosure will be described in detail with reference to FIG. 5.

Figure 5:
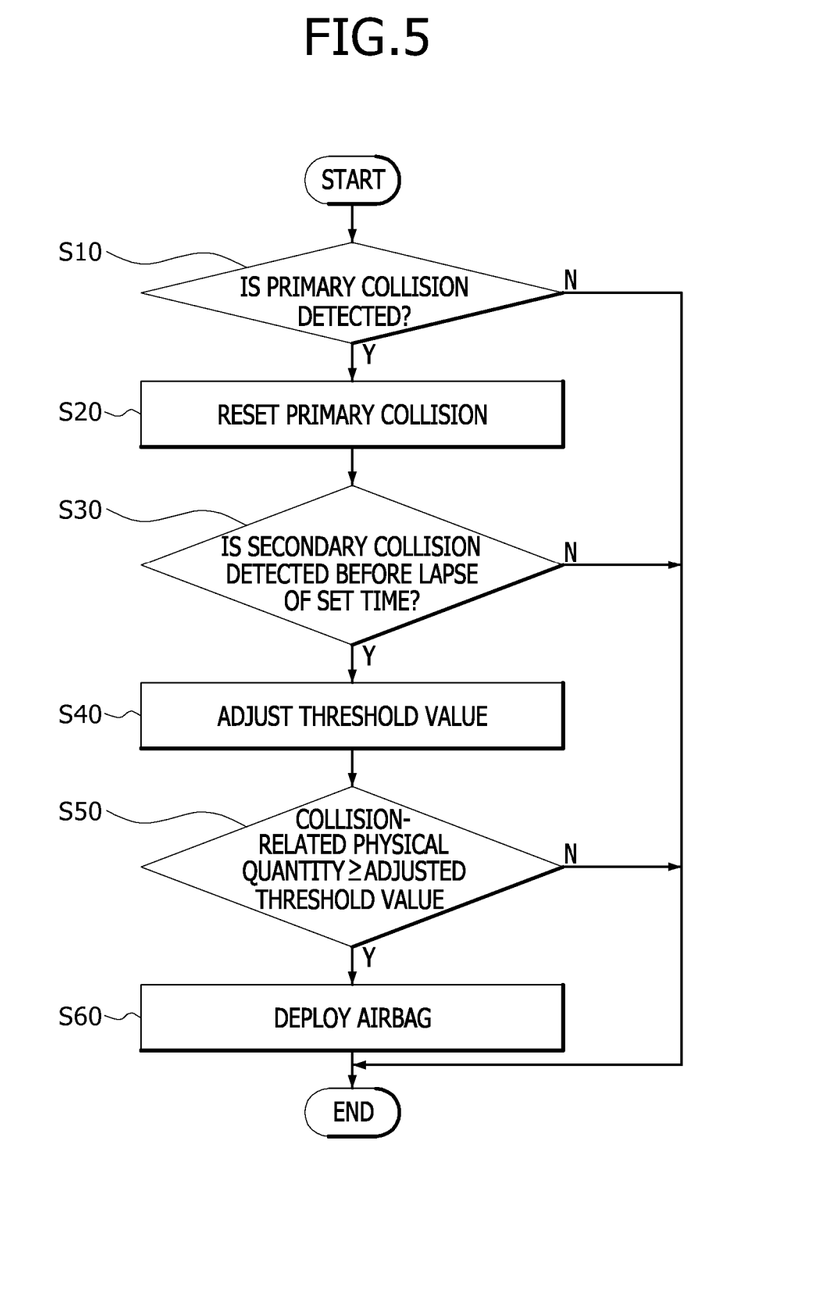
FIG. 5 is a flowchart for explaining a method for controlling the deployment of an airbag in accordance with an embodiment of the present disclosure.

FIG. 5 is a flowchart for explaining the method for controlling the deployment of an airbag in accordance with an embodiment of the present disclosure.

Referring to FIG. 5, first, the collision detection unit 10 detects a collision of the vehicle 40. In such a case, the forward collision sensor 11 detects a forward collision as an acceleration signal, the side collision sensor 12 detects a side collision as an acceleration signal, and the side pressure sensor 13 detects pressure, caused by a side collision, as an acceleration signal.

At this time, the airbag deployment control section 31 receives detection signals from the collision detection unit 10, for example, the forward collision sensor 11, the side collision sensor 12, and the side pressure sensor 13, detects collision-related physical quantities based on at least one of the detection signals for the accelerations in the longitudinal direction ACU-X and the transverse direction ACU-Y of the vehicle from the forward collision sensor 11 and the side collision sensor 12 and the detection signal of the side pressure sensor 13, and then determines whether at least one of the detected collision-related physical quantities is equal to or greater than a threshold value preset in each of the collision-related physical quantities.

At this time, the airbag deployment control section 31 deploys the airbag 20 when at least one of the collision-related physical quantities is equal to or greater than the threshold value preset in the corresponding collision-related physical quantity, and does not deploy the airbag 20 when at least one of the collision-related physical quantities is smaller than the threshold value preset in the corresponding collision-related physical quantity.

Meanwhile, the complex collision determination section 32 receives the detection signals from the forward collision sensor 11, the side collision sensor 12, and the side pressure sensor 13, detects collision-related physical quantities based on at least one of the detection signals for the accelerations in the longitudinal direction ACU-X and the transverse direction ACU-Y of the vehicle from the forward collision sensor 11 and the side collision sensor 12 and the detection signal of the side pressure sensor 13, and then detects a primary collision based on these collision-related physical quantities (S10).

At this time, when the primary collision is detected, the complex collision determination section 32 resets the collision-related physical quantities due to the primary collision (S20), and determines whether a secondary collision is detected before the lapse of a set time (S30).

That is, the complex collision determination section 32 detects collision-related physical quantities based on at least one of the detection signals for the accelerations in the longitudinal direction ACU-X and the transverse direction ACU-Y of the vehicle from the forward collision sensor 11 and the side collision sensor 12 and the detection signal of the side pressure sensor 13 within a preset time after the primary collision is detected, and determines that the secondary collision has occurred when at least one of these collision-related physical quantities is equal to or greater than the second collision reference value preset in the corresponding collision-related physical quantity.

Here, at least one of the collision-related physical quantities as a criterion for determining whether it is equal to or greater than the second collision reference value may be the same as or different from the collision-related physical quantities used when the primary collision is detected.

As described above, when the complex collision is detected by the complex collision determination section 32, the threshold value adjustment section 33 adjusts the threshold value for airbag deployment (S40). In such a case, the threshold value adjustment section 33 reduces the threshold value so that the airbag 20 may be deployed during the secondary collision.

Accordingly, during the secondary collision, the airbag deployment control section 31 compares the collision-related physical quantities detected by the collision detection unit 10 with the threshold value adjusted as described above, and determines whether at least one of the collision-related physical quantities is equal to or greater than the adjusted threshold value (S50).

As a result of the determination in step S50, when at least one of the collision-related physical quantities is equal to or greater than the adjusted threshold value, the airbag deployment control section 31 deploys the airbag 20 (S60).

That is, the airbag deployment control section 31 determines whether to deploy the airbag according to the reduced threshold value and deploys the airbag 20, thereby minimizing injury to a passenger due to the non-deployment of the airbag 20 during the complex collision.

As described above, according to the method for controlling the deployment of an airbag in accordance with an embodiment of the present disclosure, when the primary collision and the secondary collision consecutively occur, the threshold value for airbag deployment is reduced to deploy the airbag based on the reduced threshold value during the secondary collision, thereby minimizing injury to a passenger during the complex collision.

Furthermore, the method and the apparatus for controlling the deployment of an airbag in accordance with an embodiment of the present disclosure reduce a field claim due to the non-deployment of an airbag during the complex collision.

Although the present disclosure has been described with reference to the embodiments illustrated in the drawings, the embodiments of the disclosure are for illustrative purposes only, and those skilled in the art will appreciate that various modifications and equivalent other embodiments are possible from the embodiments. Thus, the true technical scope of the disclosure should be defined by the following claims.

What is claimed is:

1. A method for controlling deployment of an airbag, the method comprising steps of:
   determining whether a complex collision has occurred, based on collision-related physical quantities due to a vehicle collision; and
   adjusting a threshold value, to produce an adjusted threshold value, as a criterion for determining whether to deploy the airbag when the complex collision has occurred as a result of the determination.

2. The method according to claim 1, wherein, in the step of adjusting the threshold value for airbag deployment, the threshold value is reduced.

3. The method according to claim 1, wherein the collision-related physical quantities include at least one of velocity in an X-axis direction, displacement in the X-axis direction, velocity in a Y-axis direction, displacement in the Y-axis direction, vector values of the velocity in the X-axis direction/the velocity in the Y-axis direction, and vector values of the displacement in the X-axis direction/the displacement in the Y-axis direction.

4. The method according to claim 1, wherein, in the step of determining whether the complex collision has occurred, a primary collision is detected based on the collision-related physical quantities, and it is determined that the complex collision has occurred when a secondary collision is detected within a preset time after the primary collision is detected.

5. The method according to claim 1, further comprising a step of:
   determining whether to deploy the airbag according to the adjusted threshold value and deploying the airbag according to a result of the determination.

6. The method according to claim 5, wherein, in the step of deploying the airbag, the airbag is deployed when at least one of the collision-related physical quantities is equal to or greater than the adjusted threshold value.

7. A method for controlling deployment of an airbag, the method comprising steps of:
   detecting a primary collision based on collision-related physical quantities due to a vehicle collision;
   comparing the collision-related physical quantities, detected during the primary collision, with a threshold value as a criterion for determining whether to deploy an airbag, and deploying the airbag according to a comparison result;
   detecting a secondary collision based on the collision-related physical quantities in a state in which the airbag is not deployed;
   adjusting the threshold value, to produce an adjusted threshold value, when the secondary collision is detected; and
   determining whether to deploy the airbag according to the adjusted threshold value, and deploying the airbag according to a determination result.

8. The method according to claim 7, wherein, in the step of adjusting the threshold value, the threshold value is reduced.

9. The method according to claim 7, wherein the collision-related physical quantities include at least one of velocity in an X-axis direction, displacement in the X-axis direction, velocity in a Y-axis direction, displacement in the Y-axis direction, vector values of the velocity in the X-axis direction/the velocity in the Y-axis direction, and vector values of the displacement in the X-axis direction/the displacement in the Y-axis direction.

10. The method according to claim 7, wherein, in the step of detecting the secondary collision, the secondary collision is determined according to the collision-related physical quantities detected within a preset time after the primary collision is detected.

11. The method according to claim 7, wherein, in the step of deploying the airbag, the airbag is deployed when at least one of the collision-related physical quantities is equal to or greater than the adjusted threshold value.

12. An apparatus for controlling deployment of an airbag, the apparatus comprising:
    a complex collision determination section that determines whether a complex collision has occurred, based on collision-related physical quantities detected by a collision detection unit; and
    a threshold value adjustment section that adjusts a threshold value, to produce an adjusted threshold value, as a criterion for determining whether to deploy an airbag when the complex collision determination section determines that the complex collision has occurred.

13. The apparatus according to claim 12, wherein the threshold value adjustment section reduces the threshold value.

14. The apparatus according to claim 12, wherein the collision-related physical quantities include at least one of velocity in an X-axis direction, displacement in the X-axis direction, velocity in a Y-axis direction, displacement in the Y-axis direction, vector values of the velocity in the X-axis direction/the velocity in the Y-axis direction, and vector values of the displacement in the X-axis direction/the displacement in the Y-axis direction.

15. The apparatus according to claim 12, wherein the complex collision determination section detects a primary collision based on the collision-related physical quantities, and determines that the complex collision has occurred when a secondary collision is detected within a preset time after the primary collision is detected.

16. The apparatus according to claim 12, further comprising:
    an airbag deployment control section that determines whether to deploy the airbag according to the adjusted threshold value and deploys the airbag according to a determination result.

17. The apparatus according to claim 16, wherein the airbag deployment control section deploys the airbag when at least one of the collision-related physical quantities is equal to or greater than the adjusted threshold value.

18. An apparatus for controlling deployment of an airbag, the apparatus comprising:
    a complex collision determination section that detects a primary collision based on collision-related physical quantities due to a vehicle collision, and determines that a complex collision has occurred when a secondary collision is detected within a preset time after the primary collision is detected;
    a threshold value adjustment section that adjusts a threshold value, to produce an adjusted threshold value, when the secondary collision is detected; and
    an airbag deployment control section that compares the collision-related physical quantities, detected during the primary collision, with the threshold value as a criterion for determining whether to deploy an airbag, deploys the airbag according to a comparison result, determines whether to deploy the airbag according to the adjusted threshold value when the secondary collision is detected in a state in which the airbag is not deployed during the primary collision, and deploys the airbag according to a determination result.

19. The apparatus according to claim 18, wherein the collision-related physical quantities include at least one of velocity in an X-axis direction, displacement in the X-axis direction, velocity in a Y-axis direction, displacement in the Y-axis direction, vector values of the velocity in the X-axis direction/the velocity in the Y-axis direction, and vector values of the displacement in the X-axis direction/the displacement in the Y-axis direction.

20. The apparatus according to claim 18, wherein the airbag deployment control section deploys the airbag when at least one of the collision-related physical quantities is equal to or greater than the adjusted threshold value.

* * * * *